Apr. 24, 1923.

E. G. BEEHLER 1,452,905

AUTOMOTIVE TEST UNIT

Filed Sept. 24, 1921

INVENTOR
*E. G. Beehler.*

BY
*Fred G. Dieterich & Co.*
ATTORNEYS

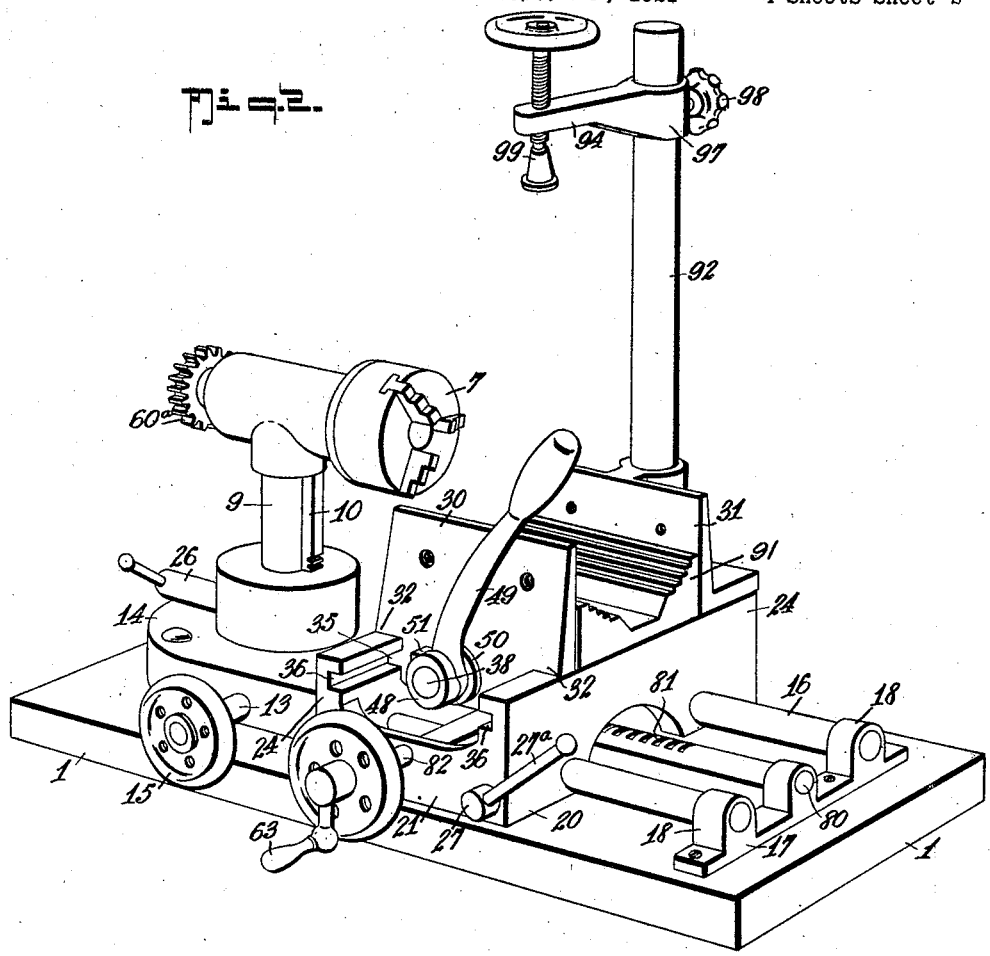

Apr. 24, 1923.
E. G. BEEHLER
AUTOMOTIVE TEST UNIT
Filed Sept. 24, 1921
1,452,905
4 Sheets-Sheet 3
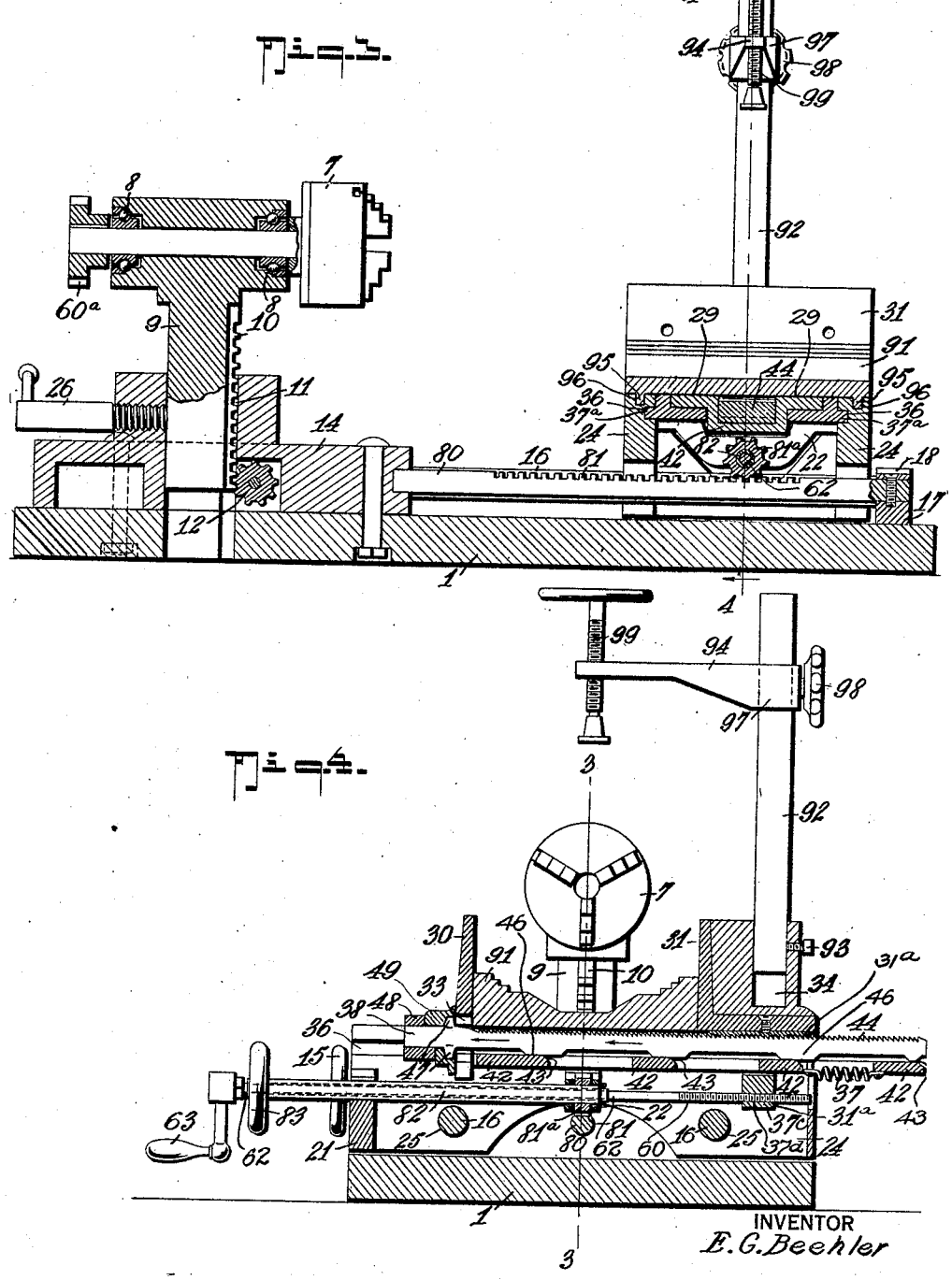
INVENTOR
*E. G. Beehler*
BY
*Fred G. Dieterich*
ATTORNEYS Apr. 24, 1923.
E. G. BEEHLER
1,452,905
AUTOMOTIVE TEST UNIT
Filed Sept. 24, 1921
4 Sheets-Sheet 4
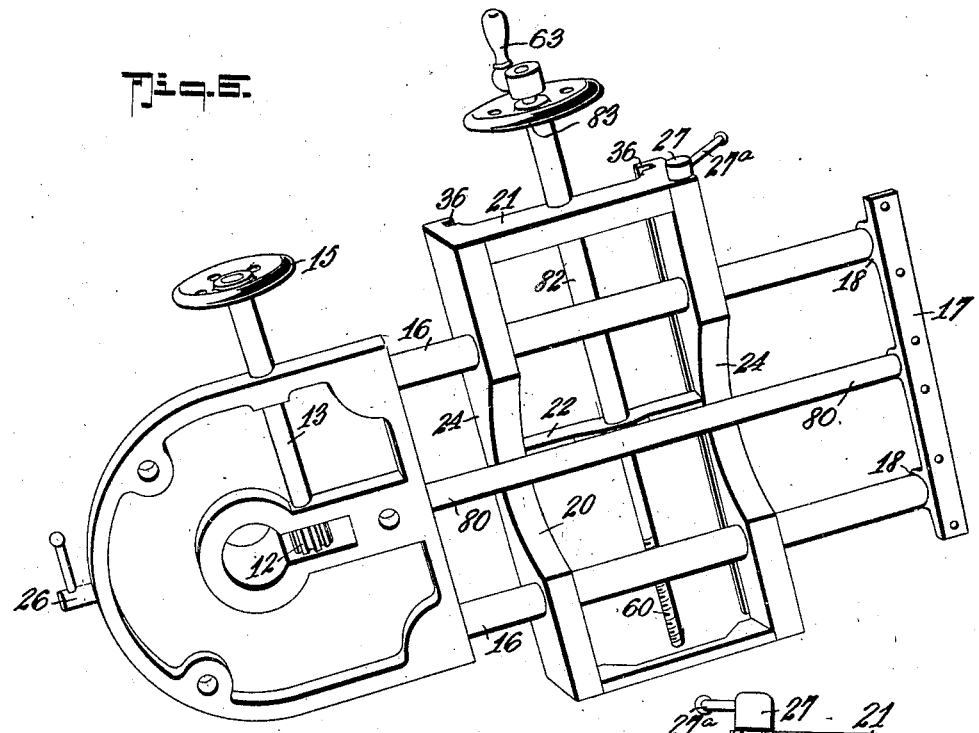
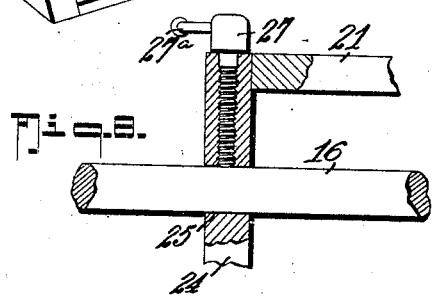
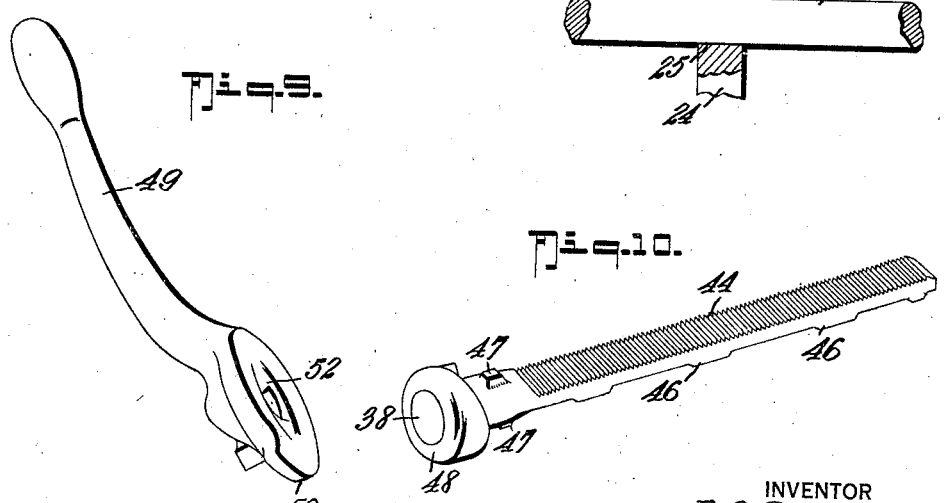
INVENTOR
*E. G. Beehler.*
BY
*Fred G. Dieterich*
ATTORNEYS Patented Apr. 24, 1923.

1,452,905

UNITED STATES PATENT OFFICE.

ELMER G. BEEHLER, OF YUMA, COLORADO.

AUTOMOTIVE TEST UNIT.

Application filed September 24, 1921. Serial No. 502,863.

*To all whom it may concern:*

Be it known that I, ELMER G. BEEHLER, a citizen of the United States, residing at Yuma, in the county of Yuma and State of Colorado, have invented a new and Improved Automotive Test Unit, of which the following is a specification.

My present invention, which generally has reference to improvements in mechanisms or apparatus designed for testing electrical equipments for automotive vehicles, more particularly relates to that type of test unit, apparatus or means disclosed in my copending application, Serial No. 421,537, filed November 3, 1920.

In my aforesaid copending application, is embodied a certain peculiar arrangement of parts, so designed and cooperatively combined, whereby the article to be tested may be readily clamped in universal adjustable relation to the driving head, which head, in itself, is adapted for adjustment, the several combinations of elements that constitute the test unit providing for readily and accurately testing a very wide range of shapes and sizes of electrical equipment, such as before mentioned, and in such manner whereby to provide for setting the article to be tested to its desired position or adjustment in a minimum amount of time.

My present invention, which embodies broadly the same general characteristics of the test unit shown and described in my aforesaid pending application, primarily has for its purpose to simplify the construction, and to so combine and improve the cooperative arrangement of the parts so as to provide a test unit for handling any class of work that any automotive service station requires and which is especially capable of handling all kinds of magnetos, generators and starters and do the required work in much less time than is possible with the construction of test unit described and shown in my other application mentioned, and, so far as I know, other similar apparatus heretofore provided.

Another object of my invention, is to provide an improved test unit that is durable and in which the life of the apparatus is greatly preserved by its simplicity of construction.

With other objects in view that will be hereinafter stated, my invention embodies the peculiar construction and the novel arrangement and combination of parts, fully stated in the following detailed description, specifically set out in the appended claims and illustrated in the accompanying drawings, in which:

Figure 3 is a longitudinal section of the test unit taken substantially on the line 3—3 of Figure 4.

Figure 4 is a transverse section of the vise arrangement shown in Figures 1, 2 and 3, and taken substantially on the line 4—4 of Figure 3.

Figure 5 is a detail perspective view of the vise with the opposing adjustable clamping elements positioned to receive square or hexagon types of generators or magnetos that cannot be accommodated by the vise arrangement, in Figures 1 and 2.

Figure 6 is an inverted perspective view of the test head base, the sliding carriage or vise holding base being also shown.

Figure 7 is a top plan view of the test head base and the vise carriage base and it also illustrates the vise carriage moving rack and gear connections.

Figure 8 is a detail plan view, parts being in section that illustrates the clamp device for holding the vise base or carriage against slipping when adjusted to or from the test head.

Figure 9 is a detail perspective view of the vise clamping cam lever.

Figure 1:
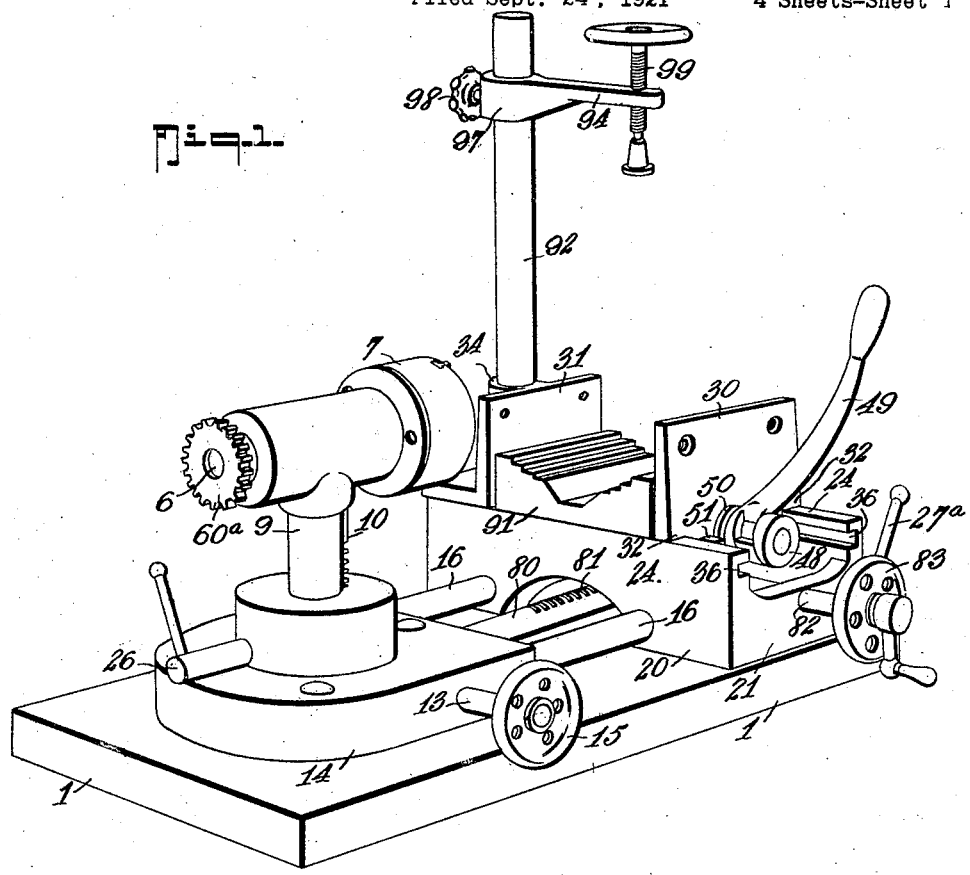
Figure 1 is a perspective view of my improved construction of test unit, the combined adjustable carriage and clamp devices including means for holding round type generators and magnetos, a vertically adjustable means being also illustrated for clamping such forms of automotive elements down onto the vise.

Figure 10 a similar view of the sliding rack bar and the cam head mounted thereon.

In my present construction of test unit, the parts constituting the said unit are mounted on a baseboard 1 to which the test head base member is fixedly bolted, as shown.

The test head or chuck holding frame 9, in my present form of test unit, has its shank provided with a vertical rack flange 10 that is guided through a radial extension of a passage 11 in the base 14. An adjusting gear 12 mounted on the inner end of a shaft 13 that is horizontally journalled in the base 14 transversely with respect to the rack 10 engages the said rack 10, and its outer end carries a hand wheel 15, by the turning of which the headframe 9 can be readily raised and lowered, as desired. A lever controlled clamp screw 26 is mounted in the hub of the base 14 and operates to firmly lock the said frame 9 to its vertical adjustments. The chuck or test head 7, which may be of any well known type, has its shaft 6 that is journalled in ball bearings 8—8 in the frame 9 and the outer end of the shaft 6 carries a toothed wheel 60ª for receiving the transmission chain from the motor (not shown) in the manner similar to that illustrated and described in my other application mentioned.

80 designates a horizontal center rail that is fixedly attached to and extends forwardly from the base 14, and 16—16 indicate a pair of oppositely disposed rods that constitute the support for the vise carriage 20, presently again referred to.

Figure 2:
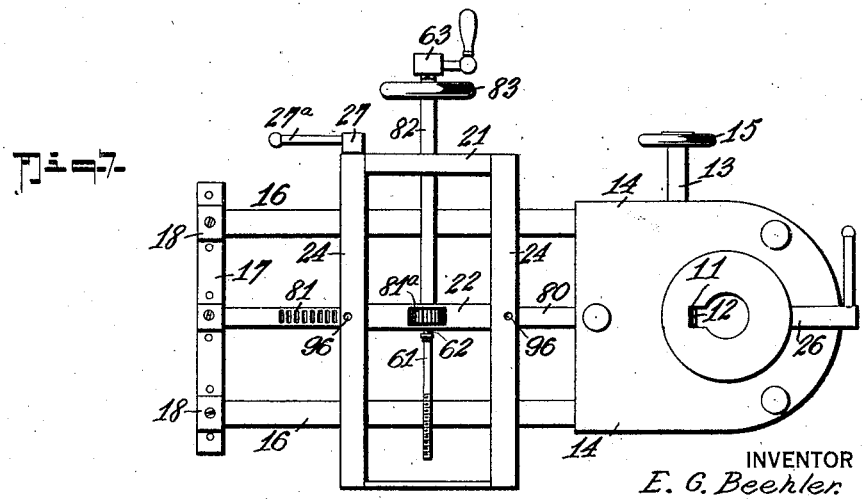
Figure 2 is a perspective view of my improved test unit, viewed from the opposite direction to that shown in Figure 1.

A cross bar 17 is secured on the base 1 and it has bearing boxes 18—18 for the outer ends of the rods 80 and 16—16, as is clearly shown in Figures 2 and 6.

The center rod 80 has a rack 81 that extends lengthwise thereof, with which a feed gear 81ª meshes, as is best shown in Figures 4, 6 and 7, by reference to which it will be observed the said gear 81 is fixed on the inner end of a tubular shaft 82 that is journalled in an end member 21 and a cross member 22, that constitute parts of the vise carriage.

A hand wheel 83 is attached to the outer end of the shaft 82 for feeding the vise carriage along the side rods 16—16, the cross bars 24—24 of the carriage having aperture bearings 25 for slidably guiding the carriage 20 along the side rods 16—16.

A screw clamp 27 engages a screw socket in one end of one of the cross bars 24, and it has a turning lever 27ª for feeding the screw clamp 27 against one of the side bars 16 (see Figure 8) after the vise carriage has been set as desired.

In my present arrangement of parts that constitute my improved automotive test unit, the vise construction is designed to provide for a wider range of use than is possible in the construction disclosed in my stated copending application.

My improved vise construction, the details of which will be best understood by reference to Figures 3 and 4, embodies generally the same features disclosed in my other construction, but in the present form the front clamping member 30 has its pendent portion provided with the cross shaped opening 33, the purpose of which will presently appear, and it also has offset portions 32—32 for slidably engaging the cross bars 24—24 of the carriage. The aforesaid pendent portion of the front clamp 30 is further provided with oppositely projected tenons 35—35 for engaging the grooves 36—36 on the inner face of the said bars 24—24 and as shown in the accompanying drawings, the clamping member 30 has an attached pair of inwardly extending horizontal arms 29—29 that are spaced apart to form a suitable guide between which the adjusting rack 44 is mounted and which has a limited slidable movement in the direction of the length and also a limited vertical movement between the arms 29—29, as will be presently more fully explained.

37 designates the tension spring for normally pulling the rack to its inward or inoperative position, the said spring being attached to the rear one of a series of cross members 42 which constitute the guide bearings that bridge across and under the space between the bars 29 and which are attached to the said bars, each of the said guides 42 having a bevelled or cam edge 43 for cooperating with the cam members 46 on the underside of the rack 44, as is clearly shown in Figure 4.

The forward end of the bar 44 terminates in a round shank 38 which has oppositely projected lugs 47—47 which fit within the vertical portions of the opening 33 in the clamp 30 to hold the rack bar 44 against rotation.

As in the construction shown in my copending application mentioned on the round shank of the bar 44 is clamped a collar 48 having a cam face adapted to be engaged by a like shaped cam face on a clamping lever 49, the lever face 52 being interposed between the collar 48 and the clamping jaw or member 30, as is best shown in Figure 4 of the drawing.

The lever 49 has a flange 50 for engaging a flange keeper 51 which holds the lever 49 to its operative position for securing the opposing jaws 30—31 to their work clamping adjustment.

The inner face of the lever has a recessed portion 52 corresponding to the cam surface of the opposite or outer face thereof and for receiving the lugs 47—47 on the rack when the said rack is pulled outwardly (see the arrows on Figure 4), for holding the jaws in their clamped adjustments.

In my present construction of vise device, the inner clamping jaw 31 has a rack section 31ª on its under side for engaging with the rack bar 44 when the latter is pulled forward and is lifted under the action of the swing of the lever 49 to the right or operative position, the same as in my other construction stated.

In the present form of my invention, the said clamping member 31 has a pendent bridge bracket 37ᶜ that has a centrally disposed internally threaded aperture 37ᵈ for receiving the threaded end 60 of a rod 61, that is adapted for being coupled, in any suitable manner, to the inner end of a shaft 62 which passes through the hollow shaft 82, before mentioned, projects beyond the front end thereof and is provided with a turning crank 63 that traverses the outer face of the end wheel 83 on the shaft 82.

By reason of providing a shaft rotatably mounted within the hollow shaft 82 and which has a screw fed connection with the inner clamping member 31, as shown, it will be readily apparent that when the cam adjusting locking lever 49 is swung toward the left to its inoperative position, that is,— when the rack bar 44 is at the lowest adjustment and disengaged from the rack member on the bottom of the clamp 31, the operator by simply turning the crank 63 can readily feed the clamping member 31 forwardly or backwardly to slide along the carriage bars 24—24, to readily center the work to the test head, as shown in Figure 2. When testing round types of generators or magnetos, a supplemental or sub-base 91 is provided, the same being in the nature of a flat bottom block having a concaved stepped upper face upon which the round bodies to be worked are held clamped down by a supplemental clamping device, as best shown in Figures 1 and 2. The block or base 91 has dowels 95 for engaging sockets 96 in the top of the cross bars 24, as shown in Figure 3.

The aforesaid supplemental clamping device comprising a vertical shaft 92 which is adapted to seat and be held within a vertical socket 34 which is a part of the cam 31 and in which the shaft 92 is held clamped to any of its rotatable adjustments by a clamping screw 93.

94 designates a clamping arm that is provided with an apertured head 97 for slidably engaging the vertical shaft 92 to which it is clamped in any of its vertical shifts by the screw clamp 98. 99 designates a hand wheel controlled screw clamp that works through the threaded aperture in the outer end of the arm and which has a disk head for engaging the top of the work to hold it down tightly onto the stepped sub-base.

From the foregoing description, taken in connection with the accompanying drawings, the complete construction of my improved automotive test unit, the manner of its operation and the advantages of my present invention will be readily apparent to those familiar with automotive service requirements.

Briefly stated, the manner of use of my present type of automotive test unit is as follows: When it is desired to clamp the article to be tested, the said article is placed between the cam faces of the jaws 30—31 of the vise and the said jaws are slid along the side bars 24—24 until the article to be worked is in the desired position with relation to the chuck head 7. If the article is a round body, the stepped sub-base is used and the said body is firmly held down onto the sub-base by a proper adjustment of the vertically and laterally adjustable clamping member, it being obvious that the clamping jaws 30—31 are held from moving up or down by reason of the tenon and groove connection with the bars 24—24, as shown and described.

After the inner jaw has been primarily shifted along to the clamping position, and it has been found necessary to make a more accurate shift thereof, the lever 49 being at or turned to the left, the further shifting of the said clamping member 31 is readily effected by turning the crank 63 on the end of the shaft 62 that is mounted within the hollow shaft 82 and which has a screw connection with the said clamping member 31, as shown.

After the desired initial adjustments of the two opposing clamping members are made, the lever 49 is turned, in clockwise direction, by reason of the cam face of the rack bar 44 and the lever now engaging causes the long rack bar to slide forward and, owing to the cam lugs 46 of the rack bar engaging the cross guides 42, the said rack bar is also lifted into interlocked engagement with the rack face of the clamping member 31, and thereby forces the said member 31 inwardly to tightly clamp the article to be tested between it and the opposing clamp 30 in the desired position, by being fed up to the chuck or testing head by shifting the device along the rod 16, which is done through a proper manipulation of the hand wheel 83 on the hollow shaft 82 that carries the gear 81ª and since the latter engages the rack face of the central rod 80 the carriage with the vise connections and the work clamped thereon may be conveniently, expeditiously and accurately brought up to the test head, as desired.

What I claim is:

1. In an automotive equipment testing means of the character described, the combination with a base, a test head carrying support mounted on the base, means mounted on the base and engaging the support for effecting vertical adjustment of the test head, a pair of parallel oppositely disposed horizontal rods and a horizontal rack rod intermediate of the parallel rod and in parallelism with the said rod, the several rods being fixedly connected to the base that supports the test head, of a vise, a supporting frame therefor mounted on the aforesaid pair of oppositely disposed rods, said vise being adapted to hold the equipment to be tested and means carried on the vise for effecting adjustment thereof on the said rods to and from the test head, the said means including a hand operable rotatable shaft having a gear engaging the rack rod.

2. In an automotive test unit of the character described, the combination with the testing head or chuck; of a carriage, means for slidably supporting the carriage for movement to and from the test head, a pair of opposing clamping members engaging the carriage, and means for effecting the adjustment of the said members along the carriage transversely with respect to the testing head, a sub-base detachably mounted on the carriage between the opposing clamping members, the said sub-base having its upper or head surface shaped for receiving round body equipment devices, and a vertically adjustable clamp supported upon and laterally movable with one of the opposing clamping members and having a portion for engaging the top of the article being tested to hold it down onto the said vise.

3. In an automotive equipment testing means of the character stated, the combination with a testing head, a support therefor, said support having a pair of forwardly extending horizontal side rods and a centrally extended rack rod; of devices for holding the equipment to be tested, the said devices including a vise carriage composed of a pair of slide bars that slidably engage the opposite side rods in the test head support and opposite end members, a hollow shaft that extends crosswise of the said rods and is mounted on the vise carriage, the said rod having a hand wheel at one end, a cog gear attached to the rod that engages the rack rod projected from the testing head support, for feeding the vise carriage to and from the testing head, a pair of opposing inner and outer clamping members slidably engaging and having transverse adjustment along the said bars of the carriage, the inner clamping member having a pendent portion provided with a screw aperture, and a feed screw mounted upon and movable with the carriage for engaging the said screw aperture, and a hand control located at the forward end of the carriage for effecting rotation of the said feed screw.

4. In an automotive equipment testing means of the character stated, the combination with a testing head, a support therefor, said support having a pair of forwardly extending horizontal side rods and a centrally extended rack rod; of devices for holding the equipment to be tested, the said devices including a carriage composed of a pair of slide bars that slidably engage the opposite side rods in the test head support and opposite end members, a hollow shaft that extends crosswise of the said rods and journals in the end members of the carriage, the said shaft having a hand wheel at one end, a cog gear attached to the shaft that engages the rack rod projected from the testing head support, for feeding the vise carriage to and from the testing head, a pair of opposing inner and outer clamping members slidably engaging and having transverse adjustment along the side bars of the carriage, the inner clamping member having a pendent portion provided with a screw aperture, a feed screw mounted upon and movable with the carriage for engaging the said screw aperture, the said hollow cog gear equipped shaft having a hand wheel at the outer end, the said screw feed shaft being rotatably mounted within the hollow shaft and having its forward end projected beyond the hand wheel end of the hollow shaft and provided with an operating crank.

5. In an automotive testing means of the character stated, a vise for holding the equipment to be tested, the said vise comprising a carriage consisting of oppositely disposed side members, a pair of opposing inner and outer clamps mounted upon and having sliding movement along the said members, operative connections that hold the clamps down onto the side members, the outer clamp having a pair of inwardly extended horizontal arms that are spaced apart, guides pendent from said arms that bridge under the space between such arms, a rack bar mounted within the space between the arms, the forward end of the said rack bar being endwise slidable through the front clamp, said bar having cam portions for engaging the aforesaid bridge guides on the aforesaid spaced arms for lifting the rack bar as it is drawn in the direction of the length, means operable in the front of the outer clamp for effecting simultaneous sliding movement of the rack bar and inward clamping movement of the outer clamp and for lifting the said rack bar, means operable at the front of the outer clamp for inwardly shifting the back clamp member, the said inner member having a rack portion on its under face adapted for engaging the slidable rack member as it is lifted up under its normal action, whereby the said inner clamp is drawn up to the work and held with the front clamp to the clamping adjustment.

ELMER G. BEEHLER.